United States Patent [19]

Pieroway et al.

[11] Patent Number: 4,590,471
[45] Date of Patent: May 20, 1986

[54] ELECTROLUMINESCENT (EL) REMOTELY-CONTROLLED LANDING ZONE MARKER LIGHT SYSTEM

[75] Inventors: Chesley S. Pieroway, Xenia; Alonzo Blount, Trotwood; George L. Britton, Yellow Springs; David J. Krile, Dayton, all of Ohio

[73] Assignee: The United States of America as represented by the Secretary of the Air Force, Washington, D.C.

[21] Appl. No.: 566,351

[22] Filed: Dec. 28, 1983

[51] Int. Cl.⁴ .................. G08G 5/00; G08C 19/00
[52] U.S. Cl. .................. 340/825.69; 244/144 R; 340/760; 340/947; 340/948; 340/696
[58] Field of Search .............. 340/696, 760, 947, 948, 340/953, 956, 350, 825.69, 825.72, 825.76; 362/62; 244/114 R; 343/135 A; 455/353, 355

[56] References Cited

U.S. PATENT DOCUMENTS

| | | | |
|---|---|---|---|
| 1,540,123 | 6/1925 | Hartney | 340/953 |
| 2,297,822 | 10/1942 | Wintermute et al. | 177/352 |
| 2,337,614 | 12/1943 | McDowell | 340/953 |
| 2,975,284 | 3/1961 | Osborne | 250/83.3 |
| 3,117,299 | 1/1964 | Lemm et al. | 340/948 |
| 3,122,721 | 2/1964 | Liu et al. | 340/825.69 |
| 3,621,290 | 11/1971 | Fryer | 340/825.76 |
| 3,906,348 | 9/1975 | Willmott | 340/825.69 |
| 3,935,557 | 1/1976 | Nichols | 340/948 |
| 3,984,069 | 10/1976 | Heyworth | 244/114 R |
| 4,141,010 | 2/1979 | Umpleby et al. | 343/225 |
| 4,272,766 | 6/1981 | Stucker et al. | 340/696 |
| 4,313,063 | 1/1982 | McHerron | 340/948 |
| 4,355,309 | 10/1982 | Hughey et al. | 340/696 |
| 4,449,073 | 5/1984 | Mongoven et al. | 340/953 |
| 4,549,179 | 10/1985 | Stendardo | 340/825.69 |

OTHER PUBLICATIONS

H. Lee Task et al, "Incandescent Versus Electroluminescent Lights for Austere Runway Lighting," 1981.
Chesley S. Pieroway, "Electroluminescent Lighting Applications," Nov. 1981.

*Primary Examiner*—John W. Caldwell, Sr.
*Assistant Examiner*—Brent A. Swarthout
*Attorney, Agent, or Firm*—Donald S. Singer; John R. Flanagan; Bobby D. Scearce

[57] ABSTRACT

A remotely-controlled lighting system for austere landing zone lighting includes a plurality of light units each having dual electroluminescent light panels, a plurality of remote controllers each having an electrical receiver, and a separate electrical transmitter. The light panel units and remote controllers, attached electrically, may also be attached physically and placed along the sides of a landing zone, while the separate transmitter is located at a remote, covert place, such as a foxhole. The transmitter and receivers of the remote controllers are capable of being preset to respectively transmit and receive a first sequence of coded pulses for turning "on" the light panel units and a second sequence of coded pulses different from the first sequence for turning "off" the light units. Also, the transmitter may be operated to repeatedly transmit one of the first or second sequence without transmitting the other sequence between the one sequence to ensure that all of the light units are either turned "on" or turned "off."

2 Claims, 10 Drawing Figures

ELECTROLUMINESCENT (EL) REMOTELY-CONTROLLED LANDING ZONE MARKER LIGHT SYSTEM

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to aircraft landing zone lighting and, more particularly, is concerned with an apparatus for illuminating and remotely operating the same.

2. Description of the Prior Art

The Air Force has requirements for a rapidly deployable, portable and remotely operable, austere aircraft landing zone marker light system. Such a system is needed to aid pilots in making successful night landings at unimproved austere landing sites for rapid deployment of troops or equipment. The ideal landing zone light system would use little power, be lightweight and portable, have sufficient visable range to be seen from several miles away, and be capable of reliable operation from a remote location.

SUMMARY OF THE INVENTION

The present invention relates to a landing zone marker light system which satisfies the aforementioned specifications. Particulary, the system uses electroluminescent (EL) lighting integrated with a remote control apparatus which provides personnel in charge of the landing zone with the capability to turn the light units of the system on or off in a reliable manner from a secure, remote location, such as a foxhole. This capability combined with the flat lighted area characteristics of the EL light units, being the preferred type of lighting, increases the survivability of the landing zone and landing aircraft by reducing the amount of time an enemy force has to acquire and target the landing zone and aircraft.

Unique features of the present invention are the dual EL lamps used in each light unit and the ability of the remotely-controlled light apparatus to transmit and receive two separate codes, one for turning the light units "on" and the other for turning the light units "off." The dual EL lamps spaced approximately one inch apart in the light unit present a visual image to the aircraft crew member of an EL lamp several times larger than the two lamps or a brighter incandescent light source. This unique visual illusion allows the fabrication of a lighting system that minimizes size, weight and power consumption while maintaining the visible range of a larger, higher energy-consuming landing system. The separate on/off code feature of the remotely-controlled apparatus overcomes a major problem experienced with existing Air Force remote control lighting systems where only a single signal is used for alternately turning the lights on and off. If all of the lights do not turn on with the first transmission of the signal, the second transmission will cause some of the light units that are on to turn off. By utilizing a different coded pulse sequence for each function if all of the light units do not come on with the first transmission, second and subsequent transmissions will not turn the "on" lights "off" and vice versa. The remote control apparatus also has the capability to be preset to multiple sets of on/off codes to allow several lighting systems to be operated in the same area by one operator.

Accordingly, the present invention is broadly directed to remotely-controlled lighting system, which includes: (a) a plurality of EL light units; (b) electrical signal receiving means being electrically connected to the light units; and (c) electrical signal transmitting means separate from the receiving means and light units. The transmitting means and receiving means are capable of being preset to respectively transmit and receive a first electrical signal for turning "on" the light units and a second electrical signal different from the first electrical signal for turning "off" the light units. More particularly, the receiving means is comprised by a plurality of remote controllers each being electrically connected, and in some embodiments of the lighting system physically attached, to one of the light units. Each of the first and second electrical signals is comprised of a different sequence of coded pulses.

BRIEF DESCRIPTION OF THE DRAWINGS

FIG. 1 is a fragmentary perspective view of several embodiments of an austere landing zone marker light system incorporating the features of the present invention. Specifically.

DETAILED DESCRIPTION OF THE INVENTION

Figure 4:
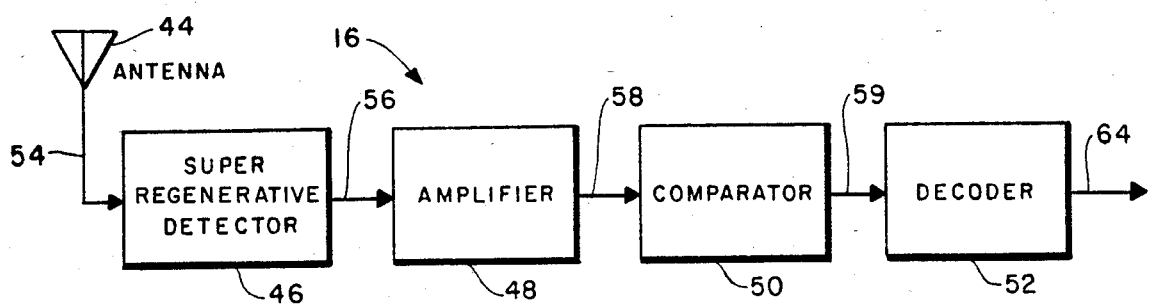
FIG. 4 is a block diagram of a receiver associated with each remote controller of FIG. 1.

Referring now to the drawings, and more particularly to FIG. 1, there is shown several embodiments of a landing zone marker lighting system incorporating the features of the present invention. In each of the embodiments, the system is disposed for illuminating opposite sides of a landing zone 12 and for providing lead-in direction to the zone which may be located in an austere, possibly hostile, environment. The lighting system includes a plurality of EL light units 14 and a plurality of remote controllers 15 which each includes an electrical signal receiver 16 (FIG. 4). The system further includes an electrical signal transmitter 18 and a strobe unit 19.

Figure 1A:
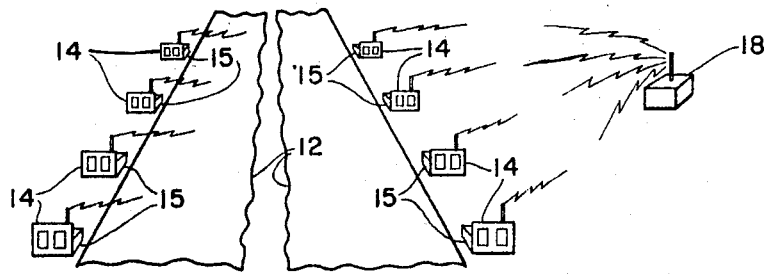
FIG. 1A is a fragmentary perspective view which includes a plurality of light units and battery-operated remote controllers positioned along opposite sides of the landing zone, a strobe connected to other light units and remote controllers positioned for lead-in direction to the landing zone, and a remote control unit positioned at a covert location away from the runway.
Figure 1A:
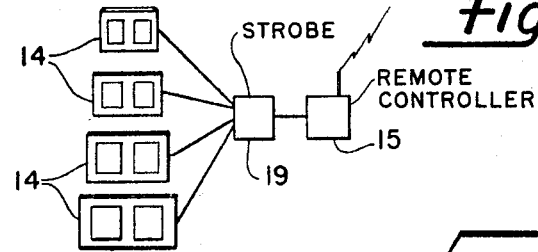
Figure 1C:
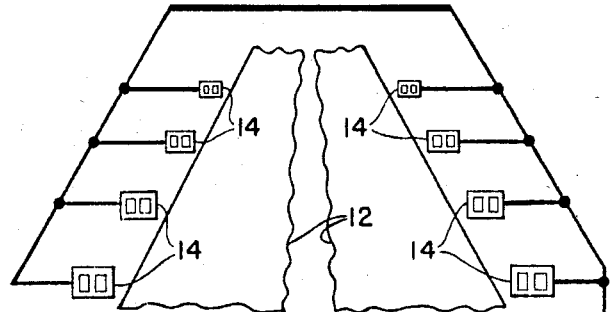
FIG. 1C is a fragmentary perspective view similar to that of FIG. 1A, but showing only the light units and strobe of the system connected to a central a.c. power source.
Figure 1B:
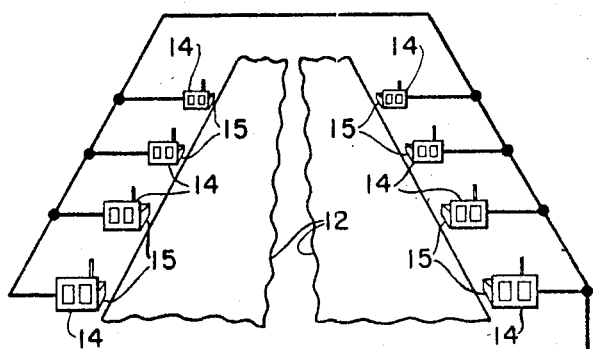
FIG. 1B is a fragmentary perspective view similar to that of FIG. 1A, but showing the system connected to a central a.c. power source.
Figure 1B:
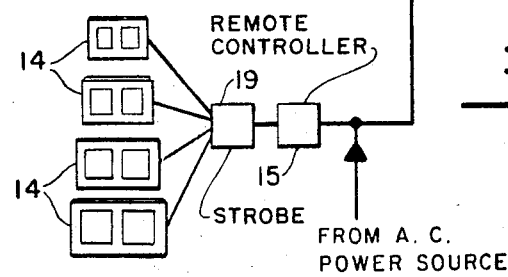

Each light unit 14 is an EL light panel which will be described later in reference to FIG. 5. Each remote controller 15 is electrically connected and can be physically attached to one of the light units 14, or one remote controller 15 is electrically connected to the strobe unit 19. Thus, each light unit and/or remote controller combination and strobe are placed in such a manner to mark the landing zone 12. However, as seen in FIG. 1A, the transmitter 18 is physically separate from the light units 14 and remote controllers 15. It is located remote from the landing zone generally in a secure place, such as a foxhole. The transmitter 18, when operated by an operator stationed at the location of the transmitter, communicates with all of the remote controllers simultaneously. If desired, the remote controllers 15 with light units 14 and strobe 19 can be electrically connected directly to an external a.c. power source, as seen in FIG. 1B, or the light units 14 and strobe 19 can be electrically powered directly from an a.c. power source, as seen in FIG. 1C.

Figure 3:
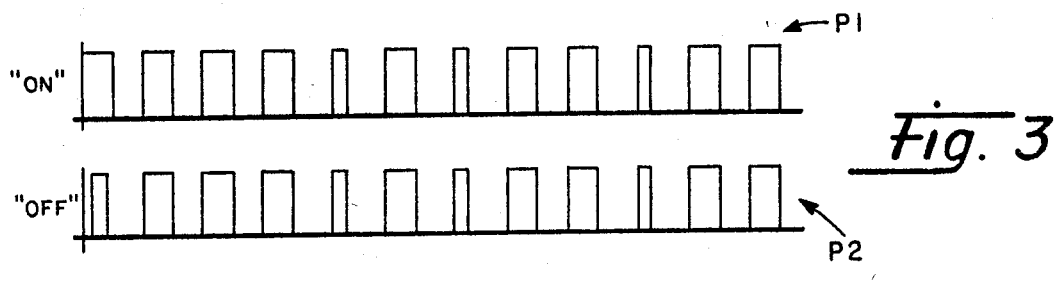
FIG. 3 illustrates examples of separate coded pulse sequences for turning the light units of FIG. 1 "on" and "off" respectively.

In one important feature of the present invention, the transmitter 18 and receivers 16 are capable of being preset to respectively transmit and receive a first sequence of coded pulses P1, such as depicted in FIG. 3, for turning "on" the light units 14 and a second sequence of coded pulses P2, such as also depicted in FIG. 3, for turning "off" the light units. To ensure that all of the light units are turned "on" or "off", whichever condition is desired, the transmitter is operable to repeatably transmit the corresponding one of the first or second pulse sequence without transmitting the other sequence between the one.

Figure 2:
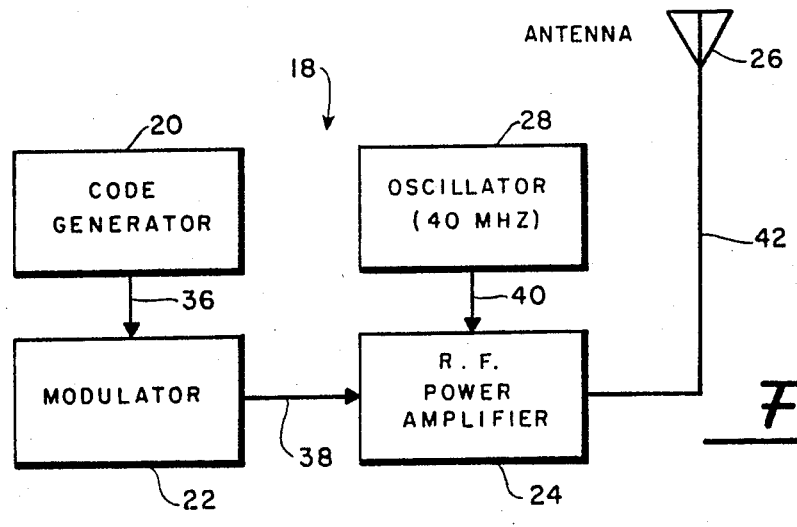
FIG. 2 is a block diagram of a transmitter comprising the remote control unit of FIG. 1.
Figure 7:
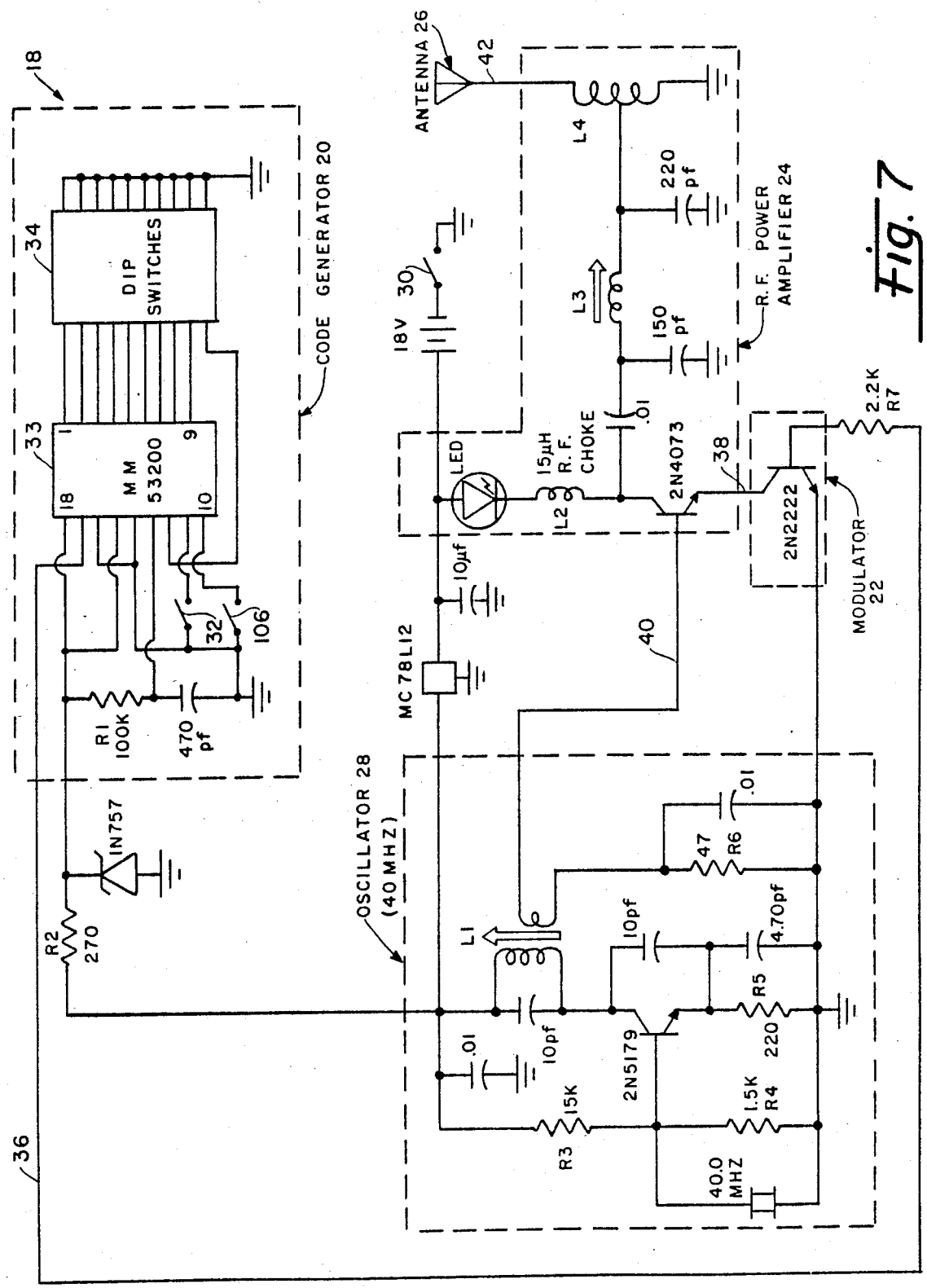
FIG. 7 illustrates an exemplary embodiment of the detailed electrical circuit which comprises each the transmitter of the landing zone marker light system.

The transmitter 18, as seen in block diagram form in FIG. 2 and in detailed circuit form in FIG. 7, includes in a serially-connected arrangement a code generator 20, a modulator 22, an r.f. power amplifier 24 and an antenna 26. The transmitter 18 also includes an oscillator 28 connected to the amplifier 24. Further, a power switch 30 and code select switch 32 (being shown only in FIG. 7) are provided which through coordinated actuation cause the transmitter 18 to transmit either the first sequence of coded pulses P1 or the second sequence of coded pulses P2. Specifically, the code generator 20 includes a code/decode module 33 and a module of preset dip switches 34 connected to some of the terminals of the module 33 such that when code select switch 32 connected to a terminal of the module 33 is in open condition, closing of power switch 30 causes the first sequence of coded pulses P1 to be generated by module 33 on output line 36. On the other hand, when code select switch 32 is in closed condition, closing of power switch 30 causes the second sequences of coded pulses P2 to be generated on output line 36.

Each of the pulse sequences P1 and P2 are outputted on line 36 to modulator 22. The modulator 22 is turned on and off in a sequence which corresponds to the coded pulses of respective sequence P1 or P2. As the modulator is turned on or off, the r.f. power amplifier 24 connected thereto by line 38 is correspondingly turned on or off. Such operation of amplifier 24 causes a r.f. carrier signal sent to the amplifier 24 on line 40 from oscillator 28 to be modulated into a pulsed format and transmitted from antenna 26 in a corresponding sequence. The antenna 26 is connected to the amplifier 24 via line 42.

Figure 8:
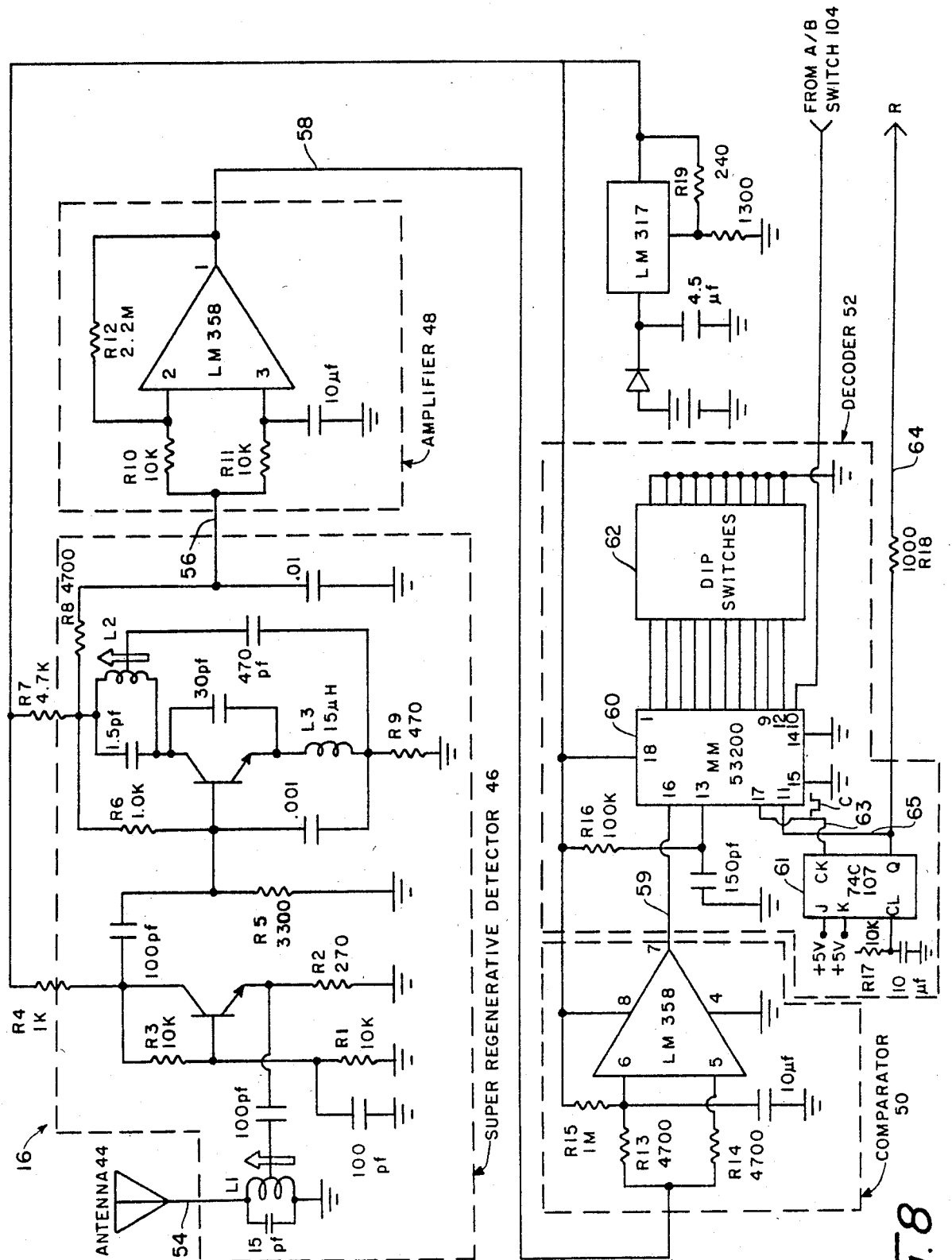
FIG. 8 illustrates an exemplary embodiment of the detailed electrical circuit which comprises each of the receivers of the landing zone marker light sytem.

The receiver 16, as seen in block diagram form in FIG. 4 and in detailed circuit form in FIG. 8, includes in a serially-connected arrangement an antenna 44, a super regenerative detector 46, an amplifier 48, a comparator 50 and a decoder 52. The antenna 44 receives the r.f. carrier signal modulated to the form of either the first or second sequence of coded pulses P1 or P2, depending upon which one is being transmitted, and outputs the same via line 54 to super regenerative detector 46. The latter outputs a signal on line 56 which has a waveform corresponding to the envelope of the input signal to the detector. This envelope signal is strengthened by amplifier 48 and then fed on line 58 to comparator 50. The comparator 50 senses the difference between the inputted signal and a fixed level d.c. voltage and outputs a pulse sequence which substantially replicates the respective one of the pulse sequences P1 or P2 being transmitted. The outputted pulse sequence is fed to decoder 52 via line 59. Decoder 52 of the receiver 16 includes a code/decode module 60, a flip-flop 61 and a module of dip switches 62 which are preset identical to dip switches 34 of the transmitter's code generator 20. When the first sequence of pulses P1 on line 59 are inputted to decoder 52 its output on line 64 goes to a high state, while, on the other hand, when the second sequence of pulses P2 are inputted to decoder 52 its output on line 64 switches to a low state. As will be seen shortly, when output line 64 of the receiver 16 is at a high state, light units 14 are turned on. In contrast, the light units 14 are turned off when the output of the receiver is in a low state.

The manner in which the high and low states are produced on output line 64 is as follows. Each time a negative-going clock pulse C is outputted on line 63 from module 60 and received at the CK input of the flip-flop 61, the Q output of the flip-flop connected to output line 64 changes states, going from either low to high, or high to low. Simultaneously, an input terminal (pin 11) of module 60, also connected to the Q output of the flip-flop 61 by line 65 correspondingly changes state. If such input terminal (pin 11) of module 60, for example, is at a high state, module 60 will output a clock pulse on line 63 when the first sequence of pulses P1 is received by the module 60 on line 59 at its input terminal (pin 16), but will not output a clock pulse on line 63 if the second sequence of pulses P2 is received. On the other hand, if input terminal (pin 11) of module 60 is at a low state, module 60 will output a clock pulse on line 63 when the second sequence of pulses P2 is received by the module 60 on line 59 at its input terminal (pin 16), but will not output a clock pulse on line 63 if the first sequence of pulses P1 is received. In other words, once the decoder 52 has received one of an "on" signal (pulse sequence P1) or an "off" signal (pulse sequence P2), its output changes to a state which causes the light units 14 to be correspondingly turned "on" or "off". The decoder of each particular receiver 16 that reacted to the particular signal will not then react to the same signal again should the operator need to transmit it again in view that for some reason some of the receivers 16 failed to react to the initial transmission of the signal (i.e., their respective light units 14 failed to turn "on" or "off" as the case may be). Instead, the decoder 52 of each particular receiver 16 that reacted to the particular one signal P1 or P2 is now set to react to only the receipt of the other of the signals P1 or P2.

Figure 5:
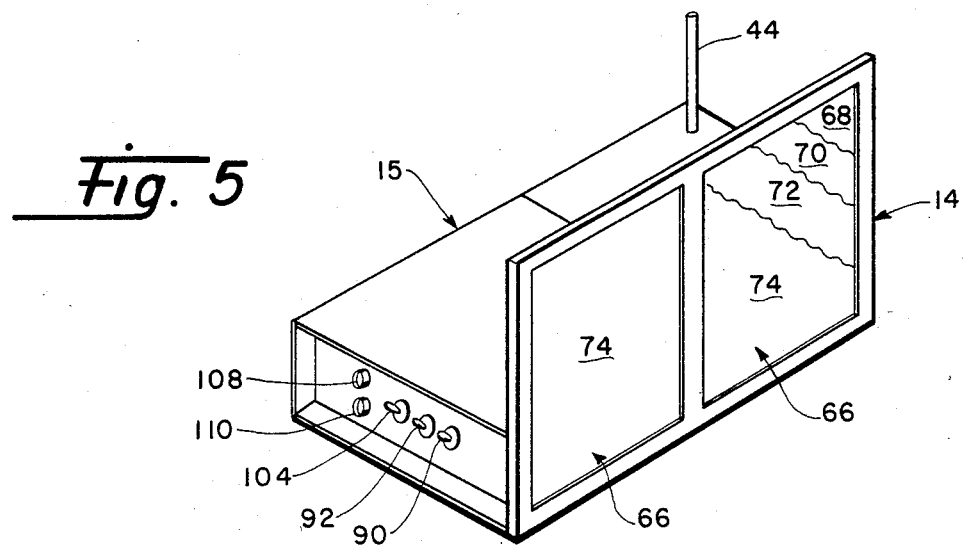
FIG. 5 is an enlarged perspective view, with parts broken away, of one of the light units of FIG. 1.

Turning now to FIG. 5, there is shown an exemplary embodiment of one of the EL light units 14. In another important feature of the present invention, each light unit 14 includes a pair or dual light panels 66. Portions of one of the light panels 66 are broken away to expose its layered structure. The panel 66 includes a bottom conductor 68, which is usually aluminum foil, and a layer 70 which may be a mixture of Barium Titanate, a dielectric, a high dielectric binder and zinc sulfide phosphor or microencapsulated phosphors deposited on the bottom conductor. Next, a transparent conductor 72 usually of tin and indium oxide is applied. Finally, a layer 74 of Mylar ™ is applied and the entire assembly, only about one-thirty-second inch thick, is sealed or laminated in plastic. Two EL panels 66, for example, each 4 inches by 4 inches in size in an exemplary embodiment, are then enclosed in the light unit 14. Each panel 66 must have a capacitance of 0.05 microfarads or lower in the exemplary embodiment disclosed herein. The light unit can be mounted in either vertical or horizontal orientations. Also, a small EL light panel 76 (FIG. 6) is mounted on the back of each light unit 14 and wired in parallel with the one panel 66 marked "EL #2" in FIG. 6. Its purpose is to provide a taxi-way marker for taxiing aircraft or to inform the operator who can be located behind the units 14, whether the light unit is turned "on".

Figure 6:
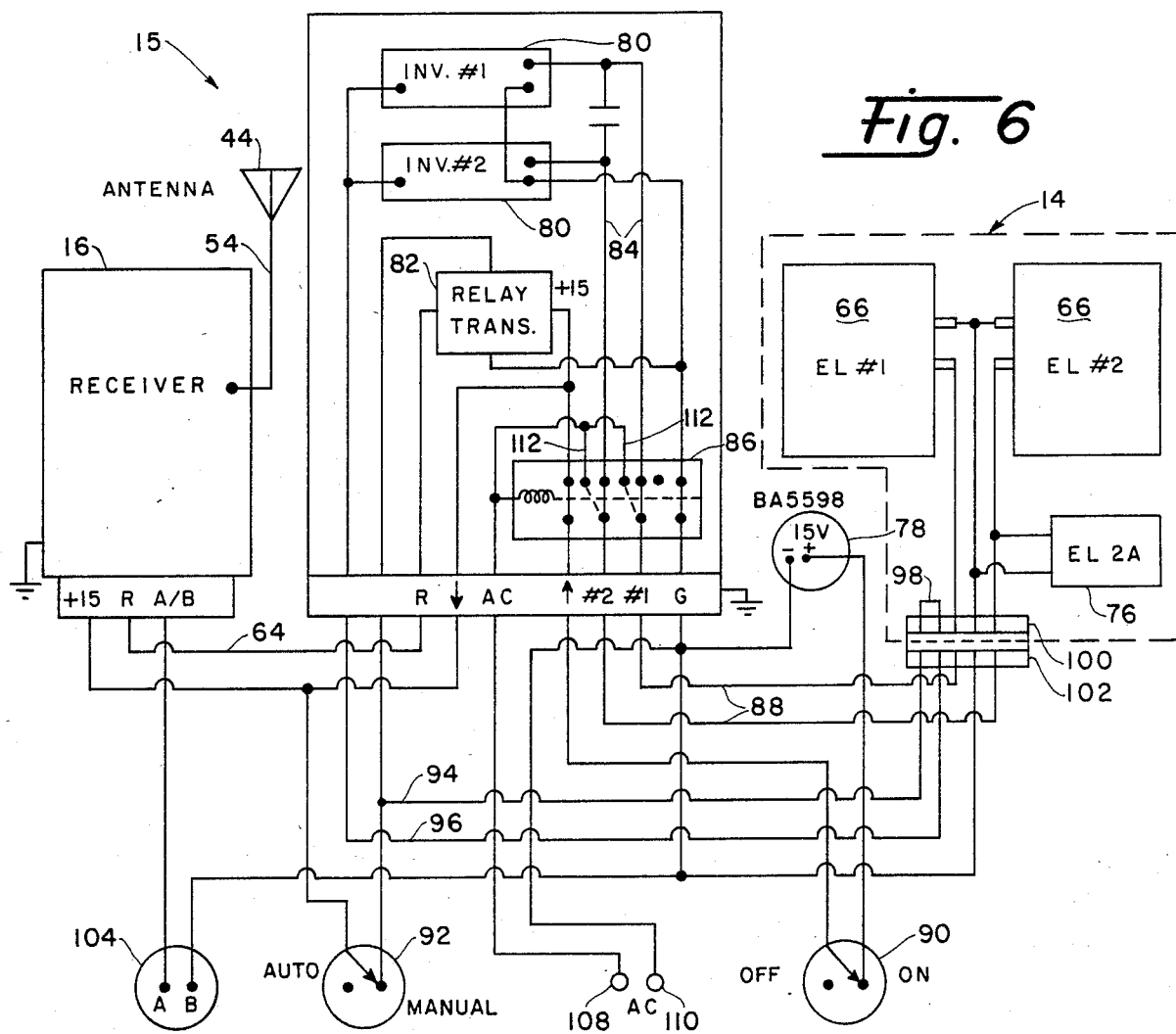
FIG. 6 illustrates an exemplary embodiment of the electrical components in each of the remote controllers and light units of FIG. 1.

FIG. 6 illustrates the electrical components associated with each remote controller 15 for electrically connecting its respective receiver 16 mounted therein to the two light panels 66 of the light unit 14. For powering the receiver and light panels, the remote controller has a d.c. battery 78 and a pair of d.c. power converters 80 mounted in the unit 14 for converting the d.c. to a.c. power. For example, 15 volts of d.c. may be converted to 115 volts 400 Hz a.c. by using converters 80. The converters 80 are connected to output 64 of the receiver 16 through a relay transistor 82. The relay transistor 82 is turned on and off by corresponding high and low states on receiver output line 64. Each of the converters, also referred to as d.c. to a.c. inverters, is connected at its output by line 84 to one of the EL light panels 66 through a relay 86. In its position shown in FIG. 6, relay 86 connects lines 88 leading from the light panels 66 with output lines 84 from converters 80. When receiver output line 64 is at a high state and an on/off switch 90 is at its "on" position, the d.c. power source, battery 78, is used to activate the lights panels 66. When an auto/-manual selection switch 92 is in a manual (closed circuit as seen in FIG. 6) mode, d.c. power is applied directly to the converters 80 through lines 94 and 96. This feature allows the light units 14 to be powered even if the receiver 16 or relay transistor 82 fails. To protect the converters 80 in a no load condition a jumper line 98 connects lines 94 and 96 in a plug 100. If plug 100 is removed from a receptacle 102 all power to the converters 80 will be interrupted. When it is desired to use strobe unit 19 in the light system, the strobe unit can be plugged into receptacle 102 in place of the plug 100 to obtain the power and remote control functions of the remote controller 15. The strobe unit 19 is, in turn, electrically connected to the light panels.

As another important feature of the present invention, two pairs of on/off codes are incorporated by means of an A/B code selection switch 104. This feature can be used to add security to the system or to allow two systems to be operated in close proximity to each other. In view that the receivers and transmitter each utilize a 12-bit dip switch module, this feature (i.e., dual code selection) can be expanded in order to externally preselect more than two codes, if desired. As seen in FIG. 8, A/B switch 104 is connected to one terminal (pin 10) of the receiver's code/decode module 60. The transmitter's code/decode module 33 also has an identical A/B switch 106. Both switches 104 and 106 must be in the same open (A) or closed (B) position in order for a set of pulse sequences P1 and P2 transmitted and detected, respectively, by the transmitter 18 and receivers 16 to be the same. Thus, if the operator believes that an enemy knows a given set of first and second pulse sequences, such as when the switches 104 and 106 are in the A position, he may change the sequence pulse set by changing the switches from the A to B position.

Alternately, as mentioned earlier in reference to FIGS. 1B and 1C, an external source of a.c. power may be used to power the light panels by connecting onto posts 108 and 110 on the remote controller 15 (see also FIG. 5), or by disconnecting the light panels 66 from the remote controller 15 and applying a.c. power directly to the light panels. Should one desire to use an a.c. power source to continuously power the light units and by-pass the remote operation feature of the present invention, it would merely be necessary to connect the source into the posts 108 and 110. The relay 86 would then be actuated so as to connect a.c. lead lines 112 with light panel input lines 88 while disconnecting converter output lines 84 from the same and disconnecting d.c. source 78 from providing power to receiver 16 and converters 80. In this mode all functions of remote controller 15 are by-passed. If a.c. power is interrupted, the remote controller relay 86 switches automatically back to d.c. power.

It is thought that the aircraft landing zone marker system of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. Remotely controlled lighting apparatus, comprising:
   (a) a plurality of light units, each of which includes a pair of side-by-side electroluminescent light panels;
   (b) electrical signal receiving means electrically connected to said light units; and
   (c) electrical signal transmitting means, said transmitting means and said receiving means capable of being preset to respectively transmit and receive a first electrical signal for turning on said light units and a second electrical signal different from said first electrical signal for turning off said light units, wherein said first and second electrical signals are each a different sequence of coded pulses;
   wherein said electrical signal transmitting means includes a transmitter separate physically from said remote controllers and light units, said transmitter being adapted to communicate electrically with each said receiver;
   wherein said transmitting means includes a code generator, a modulator, an oscillator, an R.F. power amplifier having an input coupled to said oscillator and an output coupled to a transmitting antenna;

wherein the code generator comprises a code/decode module having a plurality of terminals, a module of preset dip switches connected to some of the terminals of the code/decode module for presetting the sequence of coded pulses for the first and second electrical signals, a code select switch connected to a terminal of the code/decode module and actuatable between a first position for selecting said first electrical signal and a second position for selecting said second electrical signal, a transmit A/B select switch connected to a terminal of the code/decode module and actuatable between two positions for selecting either a first set or a second set of sequences of coded pulses for said first and second electrical signals, and resistance-capacitance means connected to terminals of the code/decode module;

wherein said modulator is a solid state device having an input terminal coupled to a terminal of the code/decode module, and an output terminal coupled to the R.F. amplifier, for coupling the coded output of the code/decode module to the R.F. power amplifier;

a power switch in series with a D.C. power supply coupled to the code/decode module, to the oscillator and to the R.F. power amplifier, the power switch being actuatable to a first position in which said transmitting means is caused to transmit one of said first and second signals according to the settings of the code select switch and the A/B select switch, and a second inoperative position in which said transmitting means is shut off, whereby said transmitting means is operable to repeatably transmit one of said first and second electrical signals without transmitting the other of said signals between said one signals;

wherein said electrical signal receiving means comprises at least one remote controller which includes a receiver and control means, the receiver having a control output coupled to the control means for supplying an "on" or an "off" signal to the control means, and the control means having relay means actuable in response to the "on" signal to connect a source of a.c. power to turn the light units on, and actuable in response to the "off" signal to disconnect the source of a.c. power to turn the light units off;

said receiver having a receiving antenna, a super regenerative detector coupled to the receiving antenna, a comparator, an amplifier coupled between the super regenerative detector and the comparator, and a decoder coupled to an output of the comparator, so that signals from the transmitting antenna are received by the receiving antenna, detected by the super regenerative detector, amplified by the amplifier, and supplied to the comparator;

wherein the comparator compares signals from the amplifier and a fixed d.c. voltage level and outputs a pulse sequence to the decoder;

wherein the decoder comprises a code/decode module having a plurality of terminals which is the same as the code/decode module of the transmitter, a flip-flop, and a module of dip switches connected to terminals of the code/decode module and preset identical to the dip switches of the code generator of the transmitter, the flip-flop being a JK flip-flop having a clock input connected to an output terminal of the code/decode module and an output connected to an input terminal of the code/decode module, the flip-flop being actuatable between a first state in which said receiver is placed in a second condition for responding to said second electrical signal and not to said first electrical signal, and a second state in which said receiver is placed in a first condition for responding to said first electrical signal but not to said second electrical signal, the code/decode module of the receiver being operable for decoding said first and second electrical signals and outputting a first actuating signal to said flip-flop when said receiver is in its first condition which switches said flip-flop to its first state, while outputting a second actuating signal to said flip-flop when said receiver is in its second condition which switches said flip-flop to its second state, the output of the flip-flop being also connected to said control output, whereby each first or second electrical signal received immediately after a corresponding first one of said first or second electrical signals by said receiver does not correspondingly turn off or on said light units;

a receive A/B select switch connected to a terminal of the code/decode module of the receiver and actuatable between two positions for selecting either said first set or said second set of sequences of coded pulses for said first and second electrical signals.

2. The lighting apparatus as recited in claim 1, wherein said receiving means includes a plurality of remote controllers each being electrically connected and physically attached to one of said light units, each said controller including a receiver adapted to electrically communicate with said transmitting means.

* * * * *